(12) United States Patent
Haubennestel et al.

(10) Patent No.: US 7,585,993 B2
(45) Date of Patent: Sep. 8, 2009

(54) ORGANOSILANE-MODIFIED POLYSILOXANES AND THEIR USE FOR SURFACE MODIFICATION

(75) Inventors: Karlheinz Haubennestel, Wesel (DE); Alfred Bubat, Wesel (DE); Daniela Betcke, Wesel (DE); Juergen Hartmann, Oberhausen (DE)

(73) Assignee: BYK-Chemie GmbH (DE)

( * ) Notice: Subject to any disclaimer, the term of this patent is extended or adjusted under 35 U.S.C. 154(b) by 381 days.

(21) Appl. No.: 11/353,856

(22) Filed: Feb. 14, 2006

(65) Prior Publication Data

US 2006/0216259 A1    Sep. 28, 2006

(30) Foreign Application Priority Data

Feb. 14, 2005    (DE) .................. 10 2005 006 848

(51) Int. Cl.
*C07F 7/00* (2006.01)
(52) U.S. Cl. ............... 556/450; 528/15; 528/31; 528/32; 528/33; 528/34; 528/41; 528/25; 528/26; 556/436; 556/437
(58) Field of Classification Search ............ 528/26, 528/25, 15, 31–34, 41; 556/445, 436–437, 556/450
See application file for complete search history.

(56) References Cited

U.S. PATENT DOCUMENTS 4,613,641 A    9/1986    Haubennestel et al.
4,812,518 A    3/1989    Haubennestel et al.
5,068,277 A    11/1991   Vukov et al.
5,387,467 A    2/1995    Hohner et al.
5,458,681 A    10/1995   Hasegawa et al.
6,140,450 A    10/2000   Ishikawa et al.

FOREIGN PATENT DOCUMENTS

DE    4234959 C1    4/1994
DE    4402712 A1    8/1994
EP    0373426 A2    6/1990
EP    0890598 A1    1/1999

OTHER PUBLICATIONS

"European Search Report for Application No. EP 06 00 2720", 7 Pages, 2006.

*Primary Examiner*—Randy Gulakowski
*Assistant Examiner*—Olatunde S Ojurongbe
(74) *Attorney, Agent, or Firm*—Schwegman, Lundberg & Woessner, P.A.

(57) ABSTRACT

The invention relates to organosilane-modified polysiloxanes of the following formula:

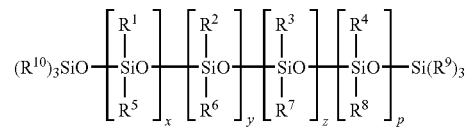

The invention additionally relates to the use of the organo-modified polysiloxanes for surface coating, and to their preparation.

26 Claims, No Drawings

ORGANOSILANE-MODIFIED POLYSILOXANES AND THEIR USE FOR SURFACE MODIFICATION

RELATED APPLICATION

This application claims priority under 35 U.S.C. 119 to German Application No. DE 10 2005 006 848.0, filed Feb. 14, 2005, which application is incorporated herein by reference and made a part hereof.

The invention relates to organosilane-modified polysiloxanes having organosilane groups attached via carbon atoms, to their preparation and to their use for modifying surfaces, particularly for the surface modification of fine particles such as surfaces of pigments, fillers and glass fibres.

The coating of pigments, fillers and glass fibres of organic polymers, polydimethylsiloxane and organosilanes in order to impart better compatibility of the normally hydrophilic pigments and fillers in organic media such as varnishes, emulsion paints, magnetic tapes and plastics is known.

By virtue of treatment with organic substances the materials usually become hydrophobic or organophilic and are better adapted to the system in which they are to be employed. In the case of pigments this is manifested in improved compatibility with the medium, greater ease of dispersion, and a higher colour yield. The agglomeration tendency and dusting tendency of the pigments and fillers are reduced.

EP 0 373 426 A2 describes the coating of pigments with polyorganosiloxanes which do not carry reactive groups and which are applied to the pigments in amounts from 0.1 percent by weight up to a maximum of 5 percent by weight. These polyorganosiloxanes contain per molecule at least one Si-alkyl and/or Si-aryl group having 9 to 25 carbon atoms, the proportion of these groups in the polysiloxane being 7 to 70 percent by weight and the remaining groups containing 1 to 8 carbon atoms.

The polysiloxanes described in Patents DE 4 140 793 C1, DE 4 140 794 C1 and EP 0 725 115 A1 contain compatibility-enhancing ester groups and epoxy groups and/or alkyl-aryl groups in the polyorganosilane molecule. The intention of this, for example, is to improve the temperature stability of the fillers thus coated. A disadvantage associated with these processes is that the organopolysiloxanes are unable to react with the pigment or filler and hence the bond formed with the pigment or filler is not stable to migration.

U.S. Pat. No. 5,631,310 uses relatively long-chain organoalkylsilanes for pigment treatment. Thus, for example, a combination of octyltriethoxysilane with a polydimethylsiloxane is used. The advantageous of this treatment with relatively long-chain alkylsilanes is that the hydrolysis of the alkoxysilanes on the pigment results in a stable attachment of the alkylsilyl radical and that subsequent migration ought therefore to be ruled out. A disadvantage of this process, however, is that the hydrolysis of the organoalkylsilanes is accompanied by release of relatively large amounts of low molecular weight alcohol. Up to three molecules of methanol or ethanol are released per long-chain alkyl group applied. This has an adverse effect in the operation, since it is necessary to remove the alcohols, and the efficiency of the pigment coating operation carried out in this way is economically unfavourable.

EP 0 257 423 describes hydrophobic colour pigments and magnetic pigments which are coated with organopolysiloxanes which in addition to various alkyl and aryl substituents also carry reactive hydrogen atoms on the polysiloxane. A disadvantage of this process is that hydrogen is formed during coating, and necessitates particular precautionary measures owing to the explosion risk during production on the industrial scale of the fillers and pigments thus coated.

Surprisingly it has been found that the disadvantages described above can be avoided in the case of a surface coating with specific organosilane-modified polysiloxanes.

The present invention accordingly provides organosilane-modified polysiloxanes of the following formula:

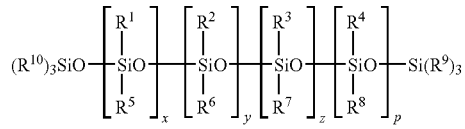

where
x=0 to 200, y=5 to 100, z=0 to 50 and p=1 to 25;
$R^1$, $R^2$, $R^3$, $R^4$ and $R^5$ independently of one another are saturated or unsaturated, straight-chain or branched alkyl radicals having 1 to 4 carbon atoms and/or aryl radicals having 6 to 9 carbon atoms;
$R^6$ is a straight-chain or branched alkyl radical having 6 to 22 carbon atoms;
$R^7$ is a radical —$(CH_2)_s$-M-Z,
  where s is 2 to 20,
  M is an aliphatic group
    containing at least one —O—CO— or —CO—O— group and optionally ether groups, and
  Z is hydrogen, —CO—$CH_3$ or a straight-chain or branched alkyl radical having 1 to 4 carbon atoms;
$R^8$ is a radical —$(CH_2)_n$—Si$(R^{11})_v(R^{12})_{3-v}$
  where v is 0, 1 or 2,
  n is 2 to 16,
  $R^{11}$ is a straight-chain or branched alkyl radical having 1 to 4 carbon atoms,
  and
  $R^{12}$ is a radical selected from the group $OR^{13}$, O—CO—$R^{13}$, halogen or haloalkyl having 1 to 6 carbon atoms,
    in which $R^{13}$ is an aromatic radical or a straight-chain, branched or cyclic alkyl radical having 1 to 6 carbon atoms and optionally containing ether and/or thioether groups; and
$R^9$ and $R^{10}$ independently of one another possess the definition of $R^1$, $R^2$, $R^3$, $R^4$, $R^5$, $R^6$, $R^7$ or $R^8$.

The organosilane-modified polysiloxanes of the invention combine the positive properties of the known polysiloxanes and have the advantage that, owing to the small amounts of alkoxysilane groups, chlorosilane groups or acetoxysilane groups per alkylpolysiloxane units applied to the pigments or fillers, the amounts of volatile organic constituents released, such as hydrogen chloride, acetic acid or alcohols, such as methanol or ethanol, are very low. In the case of the release of alcohols the amounts of alcohol per alkyl group applied are lower by up to 99% than when applying octyltriethoxysilane, for example.

In preferred embodiments of the invention x is 0 to 100, y is 5 to 50, z is 0 to 25 and p is 2 to 4, the sum of x, y, z and p being preferably 20 to 60.

The x, y, z and p "units" may occur randomly distributed in any order in the general formula. "Units" here are the molecular fragments in the square brackets of the general formula. The x "unit" is therefore, for example, [(SiO)$R^1R^5$], with the molecule containing x of the x "units".

Where x, y, z and p are greater than 1, different $R^1$, $R^2$, $R^3$, $R^4$, $R^5$, $R^6$, $R^7$ and/or $R^8$ radicals may be present within the individual x, y, z and p "units".

It is particularly advantageous if in the general formula the radicals $R^1$, $R^2$, $R^3$, $R^4$, $R^9$ and/or $R^{10}$ independently of one another are straight-chain alkyl radicals having 1 to 4 carbon atoms. Very particular preference among these is given to methyl and ethyl groups, with the methyl groups being preferred.

As described above, the alkyl radicals $R^6$ can be straight-chain or branched. Examples of straight-chain radicals $R^6$ are hexyl, heptyl, octyl, nonyl, decyl, undecyl, dodecyl, tridecyl, tetradecyl, pentadecyl, hexadecyl, heptadecyl and octadecyl radicals. Possible examples of branched alkyl radicals $R^6$ include 3-butylhexyl and 4-propyloctyl radicals. Examples of preferred straight-chain alkyl radicals $R^6$ are the n-hexyl, n-octyl and n-decyl radical, it also being possible for mixtures of these radicals to be present.

The radicals $R^6$ may be prepared by means of known processes, by addition reaction of unsaturated compounds such as 1-octene, 1-decene, 1-dodecene, 1-hexadecene and 1-octadecene, for example, with SiH-containing polysiloxanes by means of suitable catalysts, such as hexachloroplatinic acid, Speyer's catalyst, the platinum-divinyltetramethyldisiloxane complex, or in the presence of platinum compounds applied to support materials.

The hydrosilylation conditions are common knowledge. The hydrosilylation temperature is preferably between room temperature and 200° C., preferably 50 and 150° C., depending on the catalyst employed.

The radical $R^7$ is preferably a radical $-(CH_2)_3-O-(CO-(CH_2O)_n-O)_m-Z$, $-(CH_2)_2-O-(CH_2)_4-O-(CO-(CH_2)_n-O)_m-Z$ or $-(CH_2)_r-CO-OR^{14}$, where n=4 or 5, m=1 to 20, Z=H, $-CO-CH_3$ or $CH_3$, r=3 to 20, and $R^{14}$ is a straight-chain or branched alkyl radical having 1 to 18 carbon atoms.

Suitability for introducing the radicals $R^7$ is possessed for example by addition reactions of lactones, such as ε-caprolactone and/or δ-valerolactone, with ethylenically unsaturated alcohols, such as allyl alcohol, hexenol or vinyl hydroxybutyl ether. These compounds may be OH-functional, alkylated or acylated. They can likewise be introduced into the polysiloxanes of the invention by hydrosilylation reaction, by means of the catalysts described above.

The radical $R^8$ is preferably a radical derived from an alkoxy-, alkylcarbonyloxy-, halo-, or haloalkylsilane which has a group with a terminal ethylenic double bond. A terminally olefinic group of this kind may be, for example, a 1-alkylenyl group, such as a 1-undecenyl group, an allyl group or a vinyl group. Depending on the size of this group, n possesses a value of 2 to 16, preferably 2 to 12, more preferably 2 to 6 and most preferably 2 or 3.

The radical $R^8$ contains at least one Si-bonded hydrolyzable group $R^{12}$. The radical $R^{12}$ is selected from the group of $OR^{13}$, $O-CO-R^{13}$, halogen or haloalkyl having 1 to 6 carbon atoms, $R^{13}$ being an aromatic radical or a straight-chain, branched or cyclic alkyl radical having 1 to 6 carbon atoms which optionally contains ether and/or thioether groups.

The radical $R^{13}$ in $OR^{13}$ or $O-CO-R^{13}$ is, for example, methyl, ethyl, n-propyl, isopropyl, n-butyl, isobutyl, tert-butyl, pentyl, hexyl or cyclohexyl, preference being given to methyl, ethyl, n-propyl and isopropyl. If $R^{13}$ is an aromatic radical this also embraces heteroaromatic radicals. If $R^{13}$ is an aromatic radical, it is preferably a substituted or unsubstituted phenyl or naphthyl radical.

If $R^{12}$ is halogen, preferably chlorine, bromine and iodine are embraced. Particular preference is given to chlorine and bromine.

If $R^{12}$ is a haloalkyl radical having 1 to 6 carbon atoms, the alkyl radical can be straight-chain or branched and embraces halogenated, especially chlorinated, brominated and iodonated, methyl, ethyl, n-propyl, isopropyl, n-butyl, isobutyl, tert-butyl, pentyl or hexyl radicals. The radicals may be halogenated one or more times.

They are preferably monohalogenated, with the halogen attached with particular preference to a terminal carbon atom.

The radicals $R^8$ are, for example, radicals derived from a vinylalkoxysilane, such as vinyltrimethoxysilane, vinyltriethoxysilane or vinyldiethoxymethylsilane, from a vinylacetoxysilane or vinylchlorosilane. With particular preference the radicals $R^8$ are derived from a vinyltrialkoxysilane or vinyltriacetoxysilane. $R^8$ may therefore be, for example, inter alia, $-(CH_2)_2-Si(OCH_3)_3$, $-(CH_2)_2-Si(OC_2H_5)_3$ or $-(CH_2)_2-Si(O-CO-CH_3)_3$. Particular preference here is given to the ethoxy- and methoxysilanes, since in the course of the subsequent attachment reaction to pigments the alcohols formed are easy to separate off and tend to be odour-neutral as compared with acetic acid.

Examples of further possible silanes suitable for introducing the radical $R^8$ are as follows: allyl(chloromethyl)dimethylsilane, allyl(chloropropyl)dichlorosilane, allyldimethylchlorosilane, allylmethyldichlorosilane, allyltrichlorosilane, allyltriethoxysilane, allyltrimethoxysilane, 10-undecenyltrichlorosilane, vinyldimethylchlorosilane, vinyldimethylethoxysilane, vinylmethyldiacetoxysilane, vinylmethyldichlorosilane, vinylmethyldiethoxysilane, vinylmethyldimethoxysilane, vinyltriacetoxysilane, vinyltributoxysilane, vinyltrichlorosilane, vinyltriethoxysilane, vinyltrimethoxysilane, vinyltriisopropoxysilane, vinyltriphenoxysilane, vinyltris(2-methoxyethoxy)silane.

The silane groups $R^8$ can likewise be introduced by means of hydrosilylation reaction into the SiH-containing polysiloxanes, which preferably already contain the radicals $R^1$, $R^2$, $R^3$, $R^4$, $R^5$, $R^9$ and/or $R^{10}$. Preferred suitability for this purpose is possessed by the abovementioned vinylalkoxysilanes or vinylacetoxysilanes.

The above-described hydrosilylation reactions can be carried out with mixtures of the ethylenically unsaturated compounds in one step. In that case the groups $R^6$, $R^7$ and $R^8$ can be reacted simultaneously, so to speak, in the presence of the specified catalysts with the SiH-containing polysiloxane.

It may, however, be advantageous first to react only some of the SiH groups of the SiH-containing polysiloxane to give the radicals $R^6$, $R^7$ and/or $R^8$ and, in a further step, to complete the reaction of the remaining SiH groups to form radicals $R^6$.

In particular when the radical or radicals $R^8$ is or are to be introduced in a molar deficit as compared, for example, with the radical $R^6$, the latter procedure is advisable, namely the reaction of the unsaturated silanes for introducing the radical $R^8$ in a first hydrosilylation step.

In the final step, preferably, remaining SiH groups are reacted with the 1-olefin to give radicals $R^6$, since in this case excesses of 1-olefin which have not undergone addition can easily be removed again by distillation, and it is therefore ensured that, for example, proportionally lower quantities of alkoxysilane groups or the other hydrolyzable groups are present in random distribution in the polysiloxane of the invention.

The polysiloxanes of the invention prepared in this way are applied to the target materials and particles such as pigments and fillers or macroscopically planar surfaces by known processes. A macroscopically planar surface can be regarded as being any surface which is not understood as the particle surface of very small particles, such as pigments and fillers.

The term therefore embraces, for example, curved or bent bodies and also their possible edges and peak regions and the like.

The invention hence also provides for the use of the inventive or inventively obtainable organosilane-modified polysiloxanes for surface modification.

Processes appropriate for this purpose include, for example, those which can take place directly following the production of the pigments and fillers, i.e. when the pigments are still in the wet state, in the form for example of filtercakes or slurries.

In the case of these processes, the alkoxypolysiloxanes, or other hydrolyzable polysiloxanes of the present invention, can be stirred into the still-moist pigments or fillers either directly or in a wholly or partly prehydrolyzed form, it being advantageous for the polysiloxanes of the invention, for example, to be preemulsified in water with the aid of known emulsifiers.

The pigments and fillers thus treated are then dried in customary fashion and, if necessary, finely ground.

The polysiloxanes of the invention can alternatively be introduced, for example, during the grinding operation of dry pigments and fillers, by means of spray introduction or by means of other known coating processes, for example.

The hydrolysis of, for example, the alkoxy groups or of the other hydrolyzable groups of the polysiloxane of the invention, and condensation of the resultant SiOH groups on the pigment, filler or another surface, produces a migration-stable coating on these pigments and fillers.

In order to facilitate adsorption on the pigments and fillers it is also possible to carry out complete or partial prehydrolysis of the polysiloxanes of the invention, prior to application, and then to apply the prehydrolyzed polysiloxanes from an aqueous emulsion to the target pigments and fillers. Where alkoxypolysiloxanes are prehydrolyzed in such a case, the corresponding alcohols are produced, and if necessary can be removed prior to surface modification.

Suitable pigments and fillers for coating with the polysiloxanes of the invention include a multiplicity of organic and inorganic pigments and fillers.

As inorganic pigments and fillers mention may be made, for example, of titanium dioxide pigments which have been produced by the sulphate or chloride process and may be present in the rutile or anatase form and may optionally be lattice-stabilized. Further examples are zinc oxide, lithopones, iron oxide pigments, ultramarine pigments, chromate pigments, chromium oxide pigments, oxidic mixed-phase pigments such as spinel and rutile mixed-phase pigments, and as well as coloured pigments they may also be magnetic pigments.

Suitable fillers include, for example, precipitated and natural calcium carbonates, silicas from different production processes, $Al(OH)_3$, $Mg(OH)_2$, talc, mica, wollastonites, glass fibres and hollow glass beads. The organic pigments coated with the polysiloxanes of the invention may be, for example, azo pigments, metal complex pigments, anthraquinone pigments, polycyclic pigments from the group of the perylene, perinone, quinacridone, isoindoline, dioxazine, thioindigo, pyrrolopyrrole and phthalocyanine pigments.

The amount of the polysiloxanes of the invention applied to the pigments and fillers, depending on the desired degree of hydrophobicization, is preferably 0.1% to 5% by weight, based on the weight of pigment or filler. The amount to be applied also depends on the free surface area of the pigments and fillers to be treated; for example, in the case of a relatively coarse filler, 0.1% may be sufficient, while in the case of a fine organic pigment, the figure may also be 2%-5% by weight. It is preferred to apply between 0.5% to 2% by weight to the pigments and fillers.

The hydrophobicity of the pigments and fillers thus treated gives them particularly high compatibility with a multiplicity of plastics, including for example polyolefins such as polyethylene and polypropylene, and also polyvinyl chloride (PVC), polyamides, polyethylene terephthalates and the like.

Compatibility in relatively polar plastics such as polyamides, for example, can be adapted very easily by means of the group $R^7$. Therefore, if $R^7$ is present in the polysiloxanes of the present invention, i.e. z>0, for example 1, and up to 50, pigments coated with such polysiloxanes are advantageously employable in polar thermoplastic material like for example polyethylene terephthalate (PET) or thermoplastic polyurethanes. If the pigments are coated by use of emulsions formed from the polysiloxanes of the present invention, an additional content of ether groups is preferable, since such polysiloxanes tend to stabilize emulsions or are self-emulsifying. However, as lined out above, it is generally of advantage if $R^7$ is contained in the polysiloxanes of the present invention. In this case the number of groups containing $R^7$ residues within the polysiloxane is only limited by the upper value of 50. Preferably the number of groups containing $R^7$ is z=1 to 50 or more preferably 3 to 10. For use in polyethylene it is advantageous to use the group $R^7$ only in very low proportions or else to choose z=0.

The pigments treated in accordance with the invention are low in dust and free-flowing, can be dispersed very readily and hence also have excellent optical properties.

Because of the covalent attachment of the polysiloxanes of the invention to the pigments and fillers, the resistance to leaching or migration is likewise excellent.

In addition to the coating of pigments and fillers, the coating of macroscopically planar surfaces with the organosilane-modified polysiloxanes of the invention is also possible, in order to provide surfaces with hydrophobic or organophilic properties.

Since the coatable pigments and fillers may be organic or inorganic in nature, the same is true of macroscopically planar substrate surfaces. These surfaces include, for example, in addition to plastics, metals, oxides, hydroxides and ceramic materials, concrete, lime sandstone, plasterboard, natural stone, natural clinker and the like. Hence it is also possible to use the organomodified polysiloxanes of the invention in architectural preservation and facade preservation, for example.

APPLICATION EXAMPLES

1. Viscosity Measurement

The processor expects favourable rheological properties when pigments and fillers are incorporated into paints, inks, and plastics.

In particular there is a desire for low viscosity at high levels of pigment and filler.

To test the effectiveness of the modifiers for use in accordance with the invention, the pigments and fillers are treated for 1 hour in a shaker mill (Skandex model BAS 20) with 15-mm beads and addition of 0.2% to 1% by weight of the test organopolysiloxanes, and are then dispersed in di-2-ethyl-hexyl phthalate (DOP) or liquid paraffin (30 cp) using a Mizer disc (diameter=4 cm) first for 1 minute at 2000 rpm (v=4.25 m/s) and then for 3 min at 4000 rpm (v=8.5 m/s).

The viscosities of the resulting dispersions are determined in accordance with DIN 53 019 using a Contraves-Rheomat at a measurement temperature of T=25° C., with the measuring system MS-DIN 125, with a rotary speed of 5.15 rpm and a limiting frequency of 1 Hz.

In order to demonstrate covalent coverage, one selected pigment and one filler are treated with the polysiloxanes of the invention. In comparison, a non-alkoxy-modified polysiloxane is likewise applied to this pigment and the filler, and the dispersing behaviour is observed in liquid paraffin and DOP. This pigment thus treated, and the filler, are likewise subjected to solvent extraction, and, after drying, the dispersing behaviour of these extracted pigments and fillers is observed again:

For this purpose, 20 g of the coated pigment are mixed with 150 g of n-heptane at 40° C., intensively, over a period of 30 minutes. This is followed by centrifuging, and the supernatant solution was discarded. The extracted pigments were dried at room temperature for at least 24 h. The results show that there is firm bonding of the organosilane-modified polysiloxane to the pigment or filler surface, since the results correspond essentially to those for the unextracted pigments and fillers.

The results are depicted in Tables 1 and 2.

2. Dispersibility in Plastics

The dispersibility in plastics was tested in polyvinyl chloride (PVC) by the scatter incorporation test and in polyethylene (PE) by a test referred to as the blown film test.

In the scatter incorporation test, for the testing of white pigments, 50 g of PVC compound (base mixture A according to DIN 53 775) and 0.05 g of lamp black are intimately mixed in a PE beaker using a spatula and the mixture is rolled out on a mixing calender at 165° C., friction 1:1.2, in 2 minutes to give a black sheet. A weighed amount of 5 g of pigment is scattered on over the course of 0.5 min. Pigment which remains hanging on the rolls is scratched off with a copper knife and likewise incorporated into the sheet. Then the time is recorded, and samples measuring approximately 10×10 cm are taken from the PVC sheet, which is constantly turned manually, after 1, 2, 4, 8 and 16 minutes of rolling.

In the case of the testing of chromatic pigments the procedure is similar, but the components used are the white base mixture B of DIN 53 775 and 0.5 g of chromatic pigment.

Assessment is carried out on the basis of development of specks, as follows:

| Stage 1 | very good | no specks |
| Stage 2 | good | specks up to 2 min |
| Stage 3 | moderate | specks up to 4 min |
| Stage 4 | poor | specks up to 8 min |
| Stage 5 | very poor | specks up to 16 min |

In the case of the blown film test a masterbatch is first produced from 150 g of high-pressure PE (melt index approximately 20) and 350 g of pigment. This is done by mixing pigment and plastic powder by shaking in a plastic pouch, then passing the mixture through a 2-mm screen and batching it in a twin-screw extruder at 195° C. and 60 rpm.

This is followed by mixing 500 g of high-pressure PE (melt index approximately 0.5) with 7.1 g of masterbatch, extruding the mixture once at 220° C. and blowing it to form films. A 0.4-m² area of the film is investigated for pigment specks.

Dispersibility in PE:

The test for dispersibility in PE is carried out in the same way as the blown film test described above. An area of 0.4 m² of the films obtained is examined for pigment specks.

Assessment is made on the basis of the number of specks:

| very good | for less than 10 specks |
| good | for up to 20 specks |
| moderate | for up to 50 specks |
| poor | for more than 50 specks |

The coating agents used are the following organopolysiloxanes modified in accordance with the invention:

The results of the scatter incorporation test and of the blown film test are described in Tables 3 and 4.

Example 1

A four-necked flask with stirrer, reflux condenser, thermometer, dropping funnel and inert-gas feed line is charged with 200 g of polydimethyl-methyl-H-siloxane having an Si—H equivalent of 285 g/mol. The four-necked flask is evacuated to 100 mbar and then filled again with nitrogen. Then 0.0108 g of platinum-divinyltetra-methyldisiloxane complex (Pt content 25% by weight) is added. The mixture is subsequently heated to 60° C. After 60° C. have been reached, 54.2 g of 1-octene (0.48 mol) and 6.6 g of vinyltriethoxysilane (0.03 mol) are added rapidly dropwise at a rate such that the maximum reaction temperature is 110° C. The time of dropwise addition is around 30 minutes. After the end of the dropwise addition phase the after-reaction amounts to 10 minutes. Then 38.7 g of 1-octene (0.35 mol) are added dropwise so as to give a reaction temperature of 117° C. to 120° C. After the end of the dropwise addition phase the mixture is stirred at 120° C. for 1 hour. Subsequently, the remaining excess 1-octene is removed by distillation under an applied vacuum at a distillation temperature of 130° C.

Example 2

In the same way as described in Example 1, 104 g of polymethyl-H-siloxane having an Si—H equivalent of 65 g/mol were reacted with 51.6 g of vinyltrichlorosilane (0.32 mol) and 125.2 g of 1-octene (1.12 mol) in the $1^{st}$ stage. The catalyst added was 0.012 g of platinum-divinyltetramethyldisiloxane complex (Pt content 25% by weight). In the $2^{nd}$ stage the reaction was completed with 53.7 g of 1-octene (0.48 mol).

Example 3

In the same way as described in Example 1, 104 g of polymethyl-H-siloxane having an Si—H equivalent of 65 g/mol were reacted with 74.2 g of vinyltriethoxysilane (0.32 mol) and 125.2 g of 1-octene (1.12 mol) in the $1^{st}$ stage. The catalyst added was 0.013 g of platinum-divinyltetramethyldisiloxane complex (Pt content 25% by weight). In the $2^{nd}$ stage the reaction was completed with 53.7 g of 1-octene (0.48 mol).

Example 4

In the same way as described in Example 1, 104 g of polymethyl-H-siloxane having an Si—H equivalent of 65 g/mol were reacted with 47.3 g of vinyltrimethoxysilane (0.32 mol) and 125.2 g of 1-octene (1.12 mol) in the $1^{st}$ stage. The catalyst added was 0.012 g of platinum-divinyltetramethyldisiloxane complex (Pt content 25% by weight). In the $2^{nd}$ stage the reaction was completed with 53.7 g of 1-octene (0.48 mol).

Example 5

A four-necked flask with stirrer, reflux condenser, thermometer, dropping funnel and inert-gas feed line is charged with 480 g of polydimethyl-methyl-H-siloxane having an Si—H equivalent of 285 g/mol and 31.52 g of vinyltriethoxysilane (0.16 mol). The four-necked flask is evacuated to 100 mbar and then filled again with nitrogen. The reaction mixture is subsequently heated to 80° C., and, after 80° C. have been reached, 0.182 g of Speyer's catalyst (Pt content 6% by weight) is added. After the exothermic reaction has subsided, 396.48 g of 1-hexadecene (1.77 mol) are added dropwise so as to give a reaction temperature of 117° C. to 120° C. After the end of the dropwise addition phase the mixture is stirred at 120° C. for 1 hour.

Example 6

A four-necked flask with stirrer, reflux condenser, thermometer, dropping funnel and inert-gas feed line is charged with 65 g of polymethyl-H-siloxane having an Si—H equivalent of 65 g/mol, 14.8 g (0.1 mol) vinyltriethoxysilane and 55.6 g (0.1 mol) $CH_2$=CH—$CH_2$—(O—CO—$[CH_2]_5)_4$O—$COCH_3$. The four-necked flask is evacuated to 100 mbar and then filled again with nitrogen. The mixture is subsequently heated to 80° C. After 80° C. have been reached, 0.1 g of Speyer's catalyst (Pt content 6% by weight) is added. After exothermic reaction has subsided 224 g (1.0 mol) of 1-hexadecene are added dropwise so as to give a reaction temperature of 110° C. to 120° C. After the end of the dropwise addition phase the mixture is stirred at 120° C. for 1 hour.

Example 7

A four-necked flask with stirrer, reflux condenser, thermometer, dropping funnel and inert-gas feed line is charged with 65 g of polymethyl-H-siloxane having an Si—H equivalent of 65 g/mol, 22.2 g (0.15 mol) vinyltriethoxysilane and 234.6 g (0.3 mol) $CH_2$=CH—$CH_2$—(O—$CH_2$—$CH_2)_8$—(O—CO—$[CH_2]_5)_3$O—$COCH_3$. The four-necked flask is evacuated to 100 mbar and then filled again with nitrogen. The mixture is subsequently heated to 80° C. After 80° C. have been reached, 0.11 g of Speyer's catalyst (Pt content 6% by weight) is added. After exothermic reaction has subsided 176.4 g (0.9 mol) of 1-tetradecene are added dropwise so as to give a reaction temperature of 110° C. to 120° C. After the end of the dropwise addition phase the mixture is stirred at 120° C. for 1 hour.

COMPARATIVE EXAMPLE

The siloxane used for comparison is that known from DE 4140794 C1:

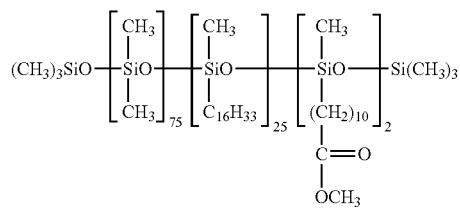

TABLE 1

Dispersion of $TiO_2$, $Al(OH)_3$ and $Mg(OH)_2$ (coated with 1% additive) in liquid paraffin to the prior art (including the extraction tests).
Viscosity in liquid paraffin [mPas]

| Product | 30% $Mg(OH)_2$ | 30% $Mg(OH)_2$ extracted | 54% $Al(OH)_3$ | 54% $Al(OH)_3$ extracted | 54% $TiO_2$ | 54% $TiO_2$ extracted |
|---|---|---|---|---|---|---|
| Untreated | n.m.* | n.m. | n.m. | n.m. | 4062 | 4200 |
| Comparative Example | 750 | 2800 | 580 | 2150 | 250 | 2050 |
| Example 1 | 645 | 1100 | 540 | 890 | 210 | 380 |
| Example 2 | 590 | 750 | 520 | 820 | 195 | 270 |
| Example 3 | 615 | 930 | 610 | 935 | 280 | 410 |
| Example 4 | 720 | 975 | 575 | 825 | 230 | 390 |
| Example 5 | 680 | 820 | 625 | 910 | 290 | 445 | n.m. = not measurable

TABLE 2

Dispersion of $TiO_2$, $Al(OH)_3$ and $Mg(OH)_2$ (coated with 1% additive) in DOP to the prior art (including the extraction tests).
Viscosity in DOP [mPas]

| Product | 30% $Mg(OH)_2$ | 30% $Mg(OH)_2$ extracted | 54% $Al(OH)_3$ | 54% $Al(OH)_3$ extracted | 54% $TiO_2$ | 54% $TiO_2$ extracted |
|---|---|---|---|---|---|---|
| Untreated | n.m.* | n.m. | n.m. | n.m. | 1830 | 1910 |
| Comparative Example | 620 | 1900 | 660 | 2350 | 344 | 1650 |
| Example 1 | 460 | 860 | 650 | 980 | 380 | 490 |
| Example 2 | 445 | 675 | 460 | 665 | 325 | 425 |

TABLE 2-continued

Dispersion of TiO$_2$, Al(OH)$_3$ and Mg(OH)$_2$ (coated with 1% additive) in DOP to the prior art (including the extraction tests).
Viscosity in DOP [mPas]

| Product | 30% Mg(OH)$_2$ | 30% Mg(OH)$_2$ extracted | 54% Al(OH)$_3$ | 54% Al(OH)$_3$ extracted | 54% TiO$_2$ | 54% TiO$_2$ extracted |
|---|---|---|---|---|---|---|
| Example 3 | 530 | 920 | 575 | 890 | 425 | 730 |
| Example 4 | 590 | 880 | 565 | 925 | 390 | 560 |
| Example 5 | 610 | 910 | 690 | 970 | 465 | 785 | n.m. = not measurable

TABLE 3

Dispersibility of TiO$_2$ (coated with 1% additive) in polyvinyl chloride (scatter incorporation test)
Dispersibility in PVC

| Product | Not extracted | Extracted |
|---|---|---|
| Untreated | very poor | very poor |
| Comparative example | very good | poor |
| Example 1 | very good | good |
| Example 2 | very good | very good |
| Example 3 | very good | Good |
| Example 4 | very good | Good |
| Example 5 | very good | Good |

TABLE 4

Dispersibility of TiO$_2$ (coated with 1% additive) in PE (blown film test)
Dispersibility in PE

| Product | Not extracted | Extracted |
|---|---|---|
| Untreated | very poor | very poor |
| Comparative example | very good | moderate |
| Example 1 | very good | good |
| Example 2 | very good | very good |
| Example 3 | very good | Good |
| Example 4 | very good | Good |
| Example 5 | very good | Good |

The invention claimed is:

1. Organosilane-modified polysiloxanes of the following formula:

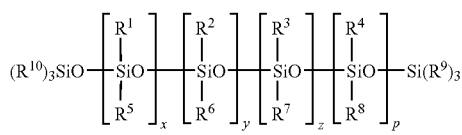

where x=0 to 200, y=5 to 100, z=1 to 50 and p=1 to 25;

R$^1$, R$^2$, R$^3$, R$^4$ and R$^5$ independently of one another are saturated or unsaturated, straight-chain or branched alkyl radicals having 1 to 4 carbon atoms and/or aryl radicals having 6 to 9 carbon atoms;

R$^6$ is a straight-chain or branched alkyl radical having 6 to 22 carbon atoms;

R$^7$ is a radical —(CH$_2$)$_s$—M—Z, where s is 2 to 20, wherein R$^7$ is always present and z is up to 50, M is an aliphatic group containing at least one —O—CO— or —CO—O— group and optionally ether groups, and Z is hydrogen, —CO—CH$_3$ or a straight-chain or branched alkyl radical having 1 to 4 carbon atoms;

R$^8$ is a radical —(CH$_2$)$_n$—Si(R$^{11}$)$_v$(R$^{12}$)$_{3-v}$ where v is 0, 1 or 2, n is 2 to 16, R$^{11}$ is a straight-chain or branched alkyl radical having 1 to 4 carbon atoms, and R$^{12}$ is a radical selected from the group OR$^{13}$, O—CO—R$^{13}$, halogen or haloalkyl having 1 to 6 carbon atoms, in which R$^{13}$ is an aromatic radical or a straight-chain, branched or cyclic alkyl radical having 1 to 6 carbon atoms and optionally containing ether and/or thioether groups; and R$^9$ and R$^{10}$ independently of one another possess the definition of R$^1$, R$^2$, R$^3$, R$^4$, R$^5$, R$^6$, R$^7$ or R$^8$.

2. Organosilane-modified polysiloxanes according to claim 1, wherein x=0 to 100, y=5 to 50, z=1 to 25, p 2 to 4, and the sum of x,y,z and p is 20 to 60.

3. Organosilane-modified polysiloxanes according to claim 1, wherein R$^1$, R$^2$, R$^3$, R$^4$, R$^9$ and R$^{10}$ independently are straight-chain alkyl radicals having 1 to 4 carbon atoms.

4. Organosilane-modified polysiloxanes according to claim 3, wherein R$^1$, R$^2$, R$^3$, R$^4$, R$^9$ and R$^{10}$ are methyl or ethyl.

5. Organosilane-modified polysiloxanes according to claim 1, wherein R$^6$ is n-hexyl, n-octyl or n-decyl.

6. Organosilane-modified polysiloxanes according to claim 1, wherein R$^7$ is a radical —(CH$_2$)$_3$—O—(CO—(CH$_2$)$_n$—O)$_m$-Z or —(CH$_2$)$_r$—CO—OR$^{14}$, where n=4 or 5, m=1 to 20, Z=H, —CO—CH$_3$ or CH$_3$, r=3 to 20, and R$^{14}$ is a straight-chain or branched alkyl radical having 1 to 18 carbon atoms.

7. Organosilane-modified polysiloxanes according to claim 6, wherein R$^7$ is introduced by addition reaction of a compound of a lactone with an ethylenically unsaturated alcohol.

8. Organosilane-modified polysiloxanes according to claim 1, wherein R$^8$ is introduced by addition reaction of a silane which carries at least one hydrolyzable Si-bonded group R$^{12}$ and which has a group with a terminal olefinic bond.

9. Organosilane-modified polysiloxanes according to claim 8, wherein the group with a terminal olefinic bond is an allyl or vinyl group.

10. Organosilane-modified polysiloxanes according to claim 8, wherein R$^{12}$ is selected from the group of halogen, haloalkyl having 1 to 3 carbon atoms, OR$^{13}$ and O—CO—R$^{13}$, where R$^{13}$ is phenyl, methyl, ethyl, n-propyl, isopropyl, n-butyl, isobutyl or tert-butyl and R$^{13}$ optionally contains ether and/or thioether groups.

11. Organosilane-modified polysiloxanes according to claim 10, wherein the halogen is chlorine, bromine or iodine.

12. Organosilane-modified polysiloxanes according to claim 8, whose hydrolyzable group has been wholly or partly reacted by hydrolysis.

13. A process for preparing organosilane-modified polysiloxanes of claim 1, comprising hydrosilating into an SiH-containing polysiloxane, which already carries the radicals $R^1$, $R^2$, $R^3$, $R^4$, $R^5$, $R^9$ and/or $R^{10}$, the radicals $R^6$, $R^7$ and $R^8$.

14. A process according to claim 13, wherein the radicals $R^6$, $R^7$ and $R^8$ are introduced in one step.

15. The process according to claim 13, wherein only some of the SiH groups of the SiH-containing polysiloxane are reacted in a first step to form the radicals $R^6$, $R^7$ and/or $R^8$ and in a further step to complete the reaction, the remaining SiH groups are reacted to form radicals $R^6$.

16. The process according to claim 13, wherein the compounds used to introduce the radical $R^6$ are removed by distillation, when they are used in excess.

17. A process according to claim 13, wherein the hydrosilylation takes place at a temperature between room temperature and 200° C. in the presence of a catalyst.

18. A process for surface modification of a material or particles comprising combining the organosilane-modified polysiloxanes of claim 1 with the material or particles.

19. The process according to claim 18 wherein the material or particles are an organic or inorganic pigment or filler.

20. The process according to claim 19, wherein the surface modification is by covalent attachment of the polysiloxanes to the organic or inorganic pigment or filler.

21. The process according to claim 18, wherein the material comprises one of macroscopically planar surfaces, a facade for preservation or an architectural construction for preservation.

22. A pigment, filler or macroscopically planar surface coated with an organosilane-modified polysiloxane of claim 1.

23. A process for surface modification of a material or particals comprising combining the material or particals with organosilane-modified polysiloxanes produced by the process of claim 13.

24. The process according to claim 23 wherein the material or particals are an organic or inorganic pigment or filler.

25. The process according to claim 23, wherein the material comprises one of a macroscopically planar surface, a facade for preservation or an architectural construction for preservation.

26. A pigment, filler or macroscopically planar surface coated with an organosilane-modified polysiloxane produced according to the process of claim 13.

* * * * *

UNITED STATES PATENT AND TRADEMARK OFFICE
CERTIFICATE OF CORRECTION

PATENT NO. : 7,585,993 B2
APPLICATION NO. : 11/353856
DATED : September 8, 2009
INVENTOR(S) : Haubennestel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fourteenth Day of September, 2010

David J. Kappos
*Director of the United States Patent and Trademark Office*